_____

United States Patent Office 3,244,708
Patented Apr. 5, 1966

_____

3,244,708
HYDROXYPHENYL-1,3,5-TRIAZINES
Max Duennenberger, Frenkendorf, Basel-Land, Hans Rudolf Biland, Basel, and Christian Luethi, Muenchenstein, Basel-Land, Switzerland, assignors to Ciba Limited, Basel, Switzerland, a Swiss company
No Drawing. Filed Feb. 6, 1964, Ser. No. 343,122
Claims priority, application Switzerland, Feb. 7, 1963,
1,526/63
29 Claims. (Cl. 260—248)

The present invention provides new, valuable hydroxyphenyl-1,3,5-triazines of the general formula (1)
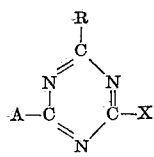

where R represents a hydroxybenzene radical which is bound through a cyclic carbon atom directly to the triazine ring and contains in ortho-position to the bond to the triazine ring a hydroxyl group and in para-position to the bond a group of the formula —O—Z (where Z stands for an alkenyl or substituted alkyl group) and A and X each represents a benzene radical bound through a cyclic carbon atom directly to the triazine ring.

The hydroxybenzene radical R may correspond, for example to the formula (2)
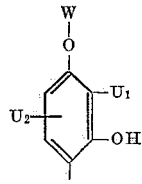

where $U_1$ and $U_2$ are identical or different and each represents a hydrogen atom, a hydroxyl group, a halogen such as fluorine or chlorine atom, an alkyl or alkoxy group with 1 to 8 carbon atoms, a phenyl group or a phenylalkyl group as benzyl, and W represents an alkenyl group with up to 8 carbon atoms, such as vinyl, allyl or crotyl or a substituted alkyl group.

Particularly suitable substituted alkyls are those which contain up to 8 carbon atoms, for example hydroxyalkyl groups such as —$CH_2CH_2OH$, —$CH_2$—$CH_2$—$CH_2$—OH, —$CH_2$—CHOH—$CH_2OH$ and

—$CH_2$—$CH_2$—$CH_2$—$CH_2$—$CH_2OH$ hydroxyalkoxyalkyl groups such as

—$CH_2$—$CH_2$—O—$CH_2$—$CH_2OH$ and —$CH_2$—$CH_2$—$CH_2$—O—$CH_2$—$CH_2$—$CH_2OH$, halogenoalkyls such as —$CH_2$—$CH_2$—Cl and —$CH_2$—$CH_2$—$CH_2$—Cl cyanoalkyl groups such as —$CH_2$—$CH_2$—$CH_2$—CN, carboxyalkyl groups such as —$CH_2$—COOH and

—$CH_2$—$CH_2$—$CH_2$—COOH carbalkoxyalkyls such as —$CH_2$—$COOCH_3$,

—$CH_2$—$COOC_2H_5$ and —$CH_2$—$CH_2$—$CH_2$—$COOC_2H_5$, aralkyl groups such as benzyl and parachlorobenzyl, acylalkyl groups such as phenacyl, —$CH_2$—CO—$CH_3$ and

—$CH_2$—$CH_2$—CO—$C_2H_5$ or the group —$CH_2$—$COOCH_2$—$CH_2OH$.

Preferably, the radical R in the Formula 1 represents a hydroxybenzene radical of the formula (3)
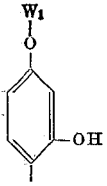

where $W_1$ represents an alkenyl, hydroxyalkyl, hydroxyalkoxyalkyl, halogenoalkyl, cyanoalkyl, carboxyalkyl, carbalkoxyalkyl, phenylalkyl or halogenophenylalkyl group with up to 8 carbon atoms or a phenacyl group.

The benzene radicals A and X in the general Formula 1 may be identical or different and represent, for example, a hydroxybenzene radical R of the kind defined above, preferably one of the Formula 3 or (3a)
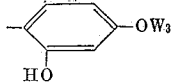

where $W_3$ represents one of the groups indicated for $W_1$—or one of the radicals of the formulae (4)
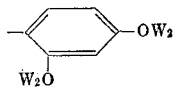

and (5)
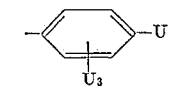

where $W_2$ stands for a hydrogen atom, or an alkenyl, hydroxyalkyl, hydroxyalkoxyalkyl, halogenoalkyl, cyanoalkyl, carboxyalkyl, carbalkoxyalkyl, phenylalkyl or halogenophenylalkyl group with up to 8 carbon atoms or a phenacyl group; U stands for a hydrogen atom, a halogen such as chlorine atom, an alkyl or alkoxy group with up to 4 carbon atoms or a phenyl group, and $U_3$ represents a hydrogen atom or an alkyl group with up to 4 carbon atoms.

Special mention among the new hydroxyphenyl-1,3,5-triazines of the general Formula 1 deserve, for example, those of the formula (6)
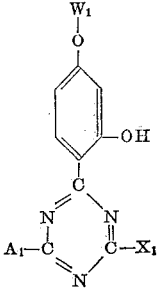

where $W_1$ stands for an alkenyl, hydroxyalkyl, hydroxyalkoxy-alkyl, halogenoalkyl, cyanoalkyl, carboxyalkyl, carbalkoxyalkyl, phenylalkyl or halogenophenylalkyl group with up to 8 carbon atoms or for a phenacyl group, and $A_1$ and $X_1$ are identical or different and each represents one of the benzene radicals of the Formulae 3, 3a, 4 or 5.

The new hydroxyphenyl-1,3,5-triazines of the above Formula 1 are obtained by known methods, for example by reacting in an anhydrous medium in the presence of a Friedel-Crafts catalyst, more especially aluminium chloride and of an inert organic solvent, a halogeno-1,3,5-triazine with a compound of the benzene series containing two hydroxyl groups in meta-position to each other, and if desired with other compounds of the benzene series, whereupon the resulting hydroxylated product is reacted with a suitable etherifying agent in a manner such that a hydroxyphenyl-1,3,5-triazine of the Formula 1 is obtained.

As examples of compounds of the benzene series that contain two hydroxyl groups in meta-position to each other there may be mentioned 1,3-dihydroxy-4-methylbenzene, 1,3,5-trihydroxybenzene and especially 1,3-dihydroxybenzene.

As examples of the compounds of the benzene series possibly required as further starting materials there may be mentioned the following:

1,3-dialkylbenzenes such as
    1,3-dimethylbenzene and
    1,3-diethylbenzene
    1-chloro-3-methylbenzene
    1-methyl-3-methoxybenzene, and
    1-n-propyl-3-methoxybenzene.

Particularly suitable etherifying agents are, for example, ethylenechlorohydrin, glycerin-α-chlorohydrin, n-allylbromide, benzyl-chloride, para-chlorobenzyl chloride, crotyl bromide, γ-bromobutyronitrile, γ-bromobutyric acid ethyl ester, 1-chloro-3-bromopropane, phenacylbromide, chloroacetic acid ethyl ester, chloroacetic acid and bromoacetic acid glycol ester.

The new hydroxyphenyl-1,3,5-triazines of the above composition may be used as stabilisers for a wide variety of organic materials, especially as ultraviolet filters.

Accordingly, the present invention includes also a process for protecting organic materials from the harmful effects of heat, air and especially ultraviolet rays, with the use of hydroxyphenyl-1,3,5-triazines of the Formula 1.

Quite generally, there are three different ways of using the new products, either separately or in combinations:

(A) The stabiliser, especially the light filter, is incorporated with a substrate to protect it from the attack by ultraviolet rays, so as to prevent a change in one or more physical properties, for example discoloration, impairment of the tear strength, embrittlement or the like and/or chemical reactions triggered off, by ultraviolet rays, for example oxidation. The incorporation may take place before or during the manufacture of the substrate or subsequently by a suitable operation, for example by a fixing operation similar to a dyeing process.

(B) The light filter is incorporated with a substrate in order to protect one or more other substances contained in the substrate, for example dyestuffs, assistants or the like. The protection of the substrate described under (A) above may be achieved at the same time.

(C) The light filter is incorporated with a "filter layer" for the purpose of protecting a substrate placed directly underneath or at a distance from it (for example in a shop window) from the attack by ultraviolet rays. The filter layer may be solid (a film, foil or dressing) or semi-solid (a cream, oil or wax).

Thus, according to the process for protecting organic materials from the harmful effects of heat, air and especially ultraviolet rays consists in incorporating a new hydroxyphenyl-1,3,5-triazine of the Formula 1 with, or fixing on, the organic material to be protected itself or a substrate containing the said material or a filter layer placed on top of the material to be protected.

As organic materials that can be protected there may be mentioned:

(a) Textile materials quite generally, which may be in any desired form, e.g., in the form of fibers, filaments, yarns, woven or knitted fabrics or as felt, and all articles manufactured therefrom; such textile materials may consist of natural materials of animal origin, such as wool or silk, or of vegetable origin such as cellulose materials from cotton, hemp, flax, linen, jute and ramie; also of semisynthetic materials such as regenerated cellulose, for example rayon, viscoses including spun rayon, or synthetic materials available by polymerisation or copolymerisation, for example polyacrylonitrile, polyvinyl chloride or polyolefines such as polyethylene and polypropylene, or those which are accessible by polycondensation, such as polyesters and above all polyamides. In the case of semisynthetic materials it is of advantage to incorporate the protective agent already with a spinning mass for example a viscose spinning mass, acetylcellulose spinning mass (including cellulose triacetate) and with masses destined for the manufacture of fully synthetic fibers, such as polyamide melts or polyacrylonitrile spinning masses, before, during or after the polycondensation or polymerisation respectively.

(b) Other fibrous materials not being textile materials; they may be of animal origin such as feathers, hairs and pelts or hides and leathers made from the latter by natural or chemical tanning, as well as manufactured goods made therefrom; also materials of vegetables origin such as straw, wood, woodpulp or fibrous materials consisting of densified fibrous materials, more especially paper, cardboard or hardboard, as well as finished products made from the latter. Also paper pulps used in the manufacture of paper (for example hollander pulps).

(c) Coating and dressing agents for textiles and papers, for example those based on starch or casein or on synthetic resins, for example from vinylacetate or derivatives of acrylic acid.

(d) Lacquers and films of diverse composition, for example those from acetylcellulose, cellulose propionate, cellulose butyrate or cellulose mixtures, for example cellulose acetate+butyrate and cellulose acetate+propionate; also nitrocellulose, vinylacetate, polyvinyl chloride, polyvinylidene chloride, copolymers of vinyl chloride and vinylidene chloride, alkyd lacquers, polyethylene, polypropylene, polyamides, polyacrylonitrile, polyesters and the like. Another way of using the hydroxyphenyl-1,3,5-triazines is their incorporation with wrapping materials, more especially the known transparent foils of regenerated cellulose (viscose) or acetylcellulose. In this case it is as a rule advantageous to add the protective agent to the mass from which these foils are manufactured.

(e) Natural or synthetic resins, for example epoxy resins, polyester resins, vinyl resins, polystyrene resins, alkyd resins, aldexhyde resins such as formaldehyde condensation products with phenol, urea or melamine, as well as emulsions of synthetic resins (for example oil-in-water or water-in-oil emulsions). In this case it is of advantage to add the protective agent before or during the polymerisation or polycondensation respectively. Furthermore, there may be mentioned synthetic resins reinforced with glass fibers and laminates made therefrom.

(f) Hydrophobic substances containing oil, fat or wax, such as candles, floor polishes, floor stains or other wood stains, furniture polishes, especially those destined for the treatment of light-colored, possibly bleached, wood surfaces.

(g) Natural rubber-like materials such as rubber, balata, gutta-percha or synthetic, vulcanisable materials such as polychloroprene, olefinic polysulphides, polybutadiene or copolymers of butadiene+styrene (for example Buna S) or butadiene+acrylonitrile (for example Buna N) which may also contain fillers, pigments, vulcanisation accelerators and the like, and in whose case the addition of the hydroxyphenyl-1,3,5-triazines aims at delaying the ageing and with it preventing changes in the plasticity properties and embrittlement.

(h) Cosmetic preparations such as perfumes, dyed or undyed soaps and bath salts, skin and face creams, powders, repellants and especially sunburn oils and creams.

It goes without saying that the hydroxyphenyl-1,3,5-triazines are suitable as protective agents not only for undyed but also for dyed or pigmented materials; in this application the protection extends also to the dyestuffs, whereby in some cases very substantial improvements of the fastness to light are achieved. If desired, the treatment with the protective agent and the dyeing or pigmenting process may be combined.

Depending on the kind of material to be treated, demands made on the efficiency and durability and other requirements the amount of the stabiliser, especially light filter, to be incorporated with the material to be treated may be varied within rather wide limits, for example from about 0.01 to 10%, preferably from 0.1 to 2%, of the weight of the material which is to be directly protected from the harmful effects of heat, air and especially ultra-violet rays.

Unless otherwise indicated, parts and percentages in the following examples are by weight.

Example 1

66 parts of 1,3-dihydroxybenzene and 37 parts of cyanuric chloride are dissolved in 400 parts of nitrobenzene. While cooling with ice and stirring, 42 parts of anhydrous aluminum chloride are added to the solution so rapidly that the temperature does not rise above 20° C. In the course of 30 minutes the temperature is then raised to 90 to 95° C. and the batch is stirred on at this temperature. The dark-red solution is then decomposed with a mixture of 1000 parts of water, 900 parts of ice and 100 parts of concentrated hydrochloric acid. The water is repeatedly decanted from the nitrobenzene layer until it reacts neutral. The mixture is then subjected to steam distillation and the precipitated product of the formula (7)

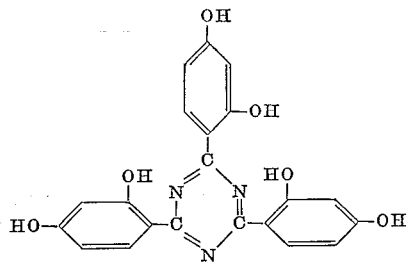

is suctioned off. On drying, it yields 75 to 80 parts of yellow crystals. After two recrystallisations from dimethylformamide the yellow needles reveal the following analytical data.

$C_{21}H_{15}O_6N_3 \cdot C_3H_7ON$ (M.P. above 300° C.) calculated: C, 60.24; H, 4.63; N, 11.71%. Found: C, 60.42; H, 4.47; N, 11.16%.

9.8 parts of the compound of the Formula 7 are added to a solution of 9 parts of potassium hydroxide in 200 parts of ethyleneglycol monomethyl ether. While stirring at 70° C., 13 parts of ethylenechlorohydrin are then dropped in, the batch is stirred on for 4½ hours and the reaction solution is poured into 300 parts of 2 N-hydrochloric acid and 200 parts of ice; the precipitate is suctioned off, washed neutral with water and dried at 70 to 80° C. under vacuum, to yield about 8 to 9 parts of the compound of the formula (8)

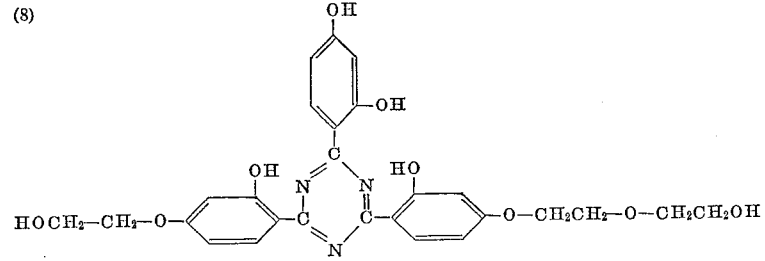

The analytically pure product obtained by recrystallisation from dioxane+ethyleneglycol monomethyl ether melts at 283–285° C.

$C_{27}H_{27}N_3O_9$ calculated: C, 60.33; H, 5.06; N, 7.82%. Found: C, 60.61; H, 5.02; N, 7.87%.

Example 2

When in the first paragraph of Example 1 cyanuric chloride is replaced by an equivalent amount of 2-phenyl-4,6-dichloro-1,3,5-triazine, the compound of the formula (9)

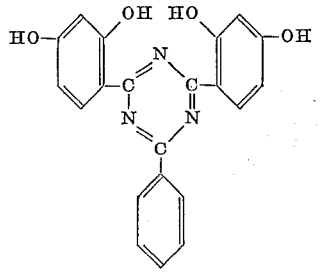

is obtained in similar purity and yield. It melts above 300° C.

$C_{21}H_{15}O_4N_3$ calculated: C, 67.55; H, 4.05; N, 11.26%. Found: C, 67.07; H, 4.13; N, 11.55%.

37.3 parts of the compound of the Formula 9 are dissolved in 300 parts of dimethylformamide containing 10 parts of sodium hydroxide and in the course of one hour 27 parts of n-allylbromide are dropped in at 80° C. The reaction solution is stirred on for 4½ hours at 80° C., then heated to the reflux temperature (145° C.) and maintained at this temperature for 15 minutes. The solution is cooled to 70° C. and 25 parts by volume of concentrated hydrochloric acid are added. The precipitated product of the formula (10)

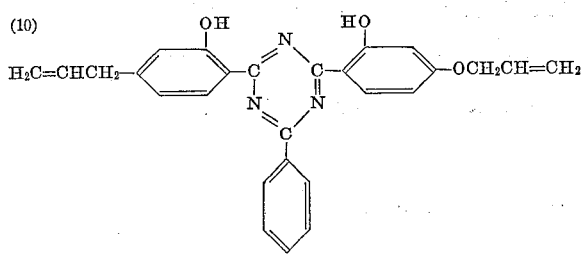

is suctioned off at room temperature and washed neutral with water. Yield: 42 parts. An analytically pure product obtained on recrystallisation from benzene+cyclohexane melts at 178° C.

$C_{27}H_{23}N_3O_4$ calculated: C, 71.51; H, 5.11; N, 9.27%. Found: C, 71.62; H, 5.28; N, 9.07%.

When n-allylbromide is replaced by 25.5 parts of benzyl chloride and the crude product is recrystallised from dioxane+cyclohexane, the compound of the formula

(11)
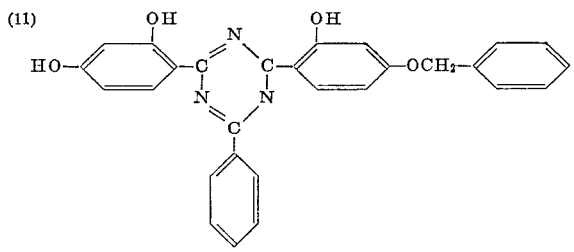

is obtained. The analytically pure product melts at 242 to 246° C.

$C_{28}H_{21}N_3O_4$ calculated: C, 72.56; H, 4.57; N, 9.07%. Found: C, 72.18; H, 4.77; N, 8.95%.

When benzyl bromide is used in an excess of 25% over the calculated amount, the product of the formula

(12)
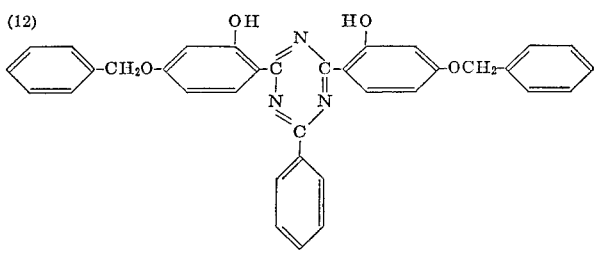

is obtained in a yield of 54.6 parts. The analytically pure product obtained by recrystallization from dioxane +methanol melts at 171 to 172.5° C.

$C_{35}H_{27}N_3O_4$ calculated: C, 75.93; H, 4.92; N, 7.59%. Found: C, 75.93; H, 4.81; N, 7.53%.

*Example 3*

18.7 parts of the compound of the Formula 9 are dissolved in 300 parts of dimethylformamide containing 5 parts of sodium hydroxide. In the course of 1 hour at 80° C. 25 parts of para-chlorobenzyl chloride are dropped in and the reaction solution is stirred on for 5 hours at 80° C., cooled to room temperature (18 to 20° C.) and the reaction mixture is poured into water. The precipitate is filtered off and freed from by-products by being boiled in alcohol. The product of the formula

(13)
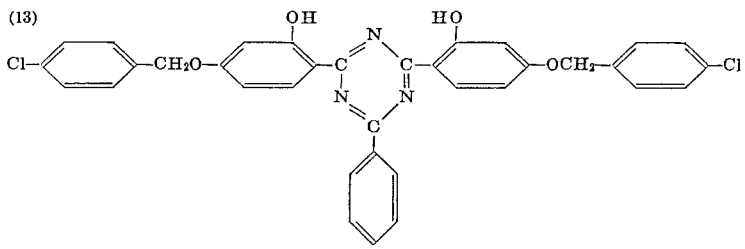

is sparingly soluble in alcohol and is recrystallised from dioxane+cyclohexane. The analytically pure product melts at 265 to 267° C.

$C_{35}H_{25}N_4O_4Cl$ calculated: C, 67.53; H, 4.05; N, 6.75%. Found: C, 67.89; H, 4.08; N, 6.77%.

*Example 4*

14.8 parts of the compound of the Formula 9 are heated at 20° C. together with 100 parts of ethylenechlorohydrin in 100 parts of dimethylformamide until a homogeneous solution has formed. In the course of one hour 19.2 parts of sodium hydroxide in 20 parts of water are dropped into the clear solution at 65 to 70° C. When all sodium hydroxide solution has been added, the batch is cooled to room temperature (18 to 20° C.), and the precipitated product of the formula

(14)
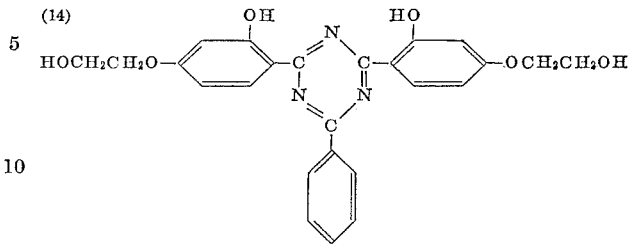

is suctioned off, washed with 2 N-hydrochloric acid and then with water, and recrystallised from aqueous dioxane, to give a yield of 9.7 parts. The analytically pure product melts at 252 to 253° C.

$C_{25}H_{23}N_3O_6$ calculated: C, 65.07; H, 5.02; N, 9.11%. Found: C, 65.30; H, 5.00; N, 9.39%.

*Example 5*

18.7 parts of the compound of the Formula 9 are dissolved in 200 parts of ethyleneglycol monomethyl ether containing 5.6 parts of sodium hydroxide, and 12.5 parts of crotyl bromide are tipped in at 80° C. The temperature is then maintained for 3 hours at 35 to 40° C. and then for another 2 hours at 65 to 70° C. The product of the formula

(15)
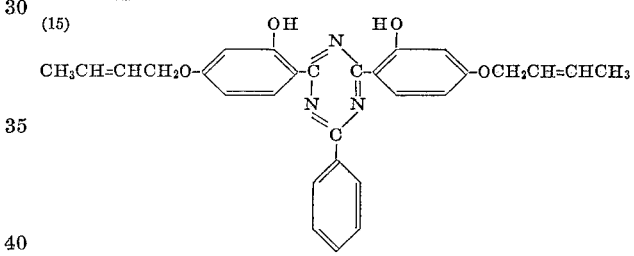

crystallises from the reaction solution. The batch is cooled to room temperature (18 to 20° C.), and the crude product is suctioned off and recrystallised from benzene +methanol. The analytically pure product melts at 212–213° C.

$C_{29}H_{27}N_3O_4$ calculated: C, 72.33; H, 5.65; N, 8.73%. Found: C, 72.25; H, 5.77; N, 8.63%.

When crotyl bromide is replaced by the calculated amount of γ-bromobutyronitrile, the product of the formula

(16)
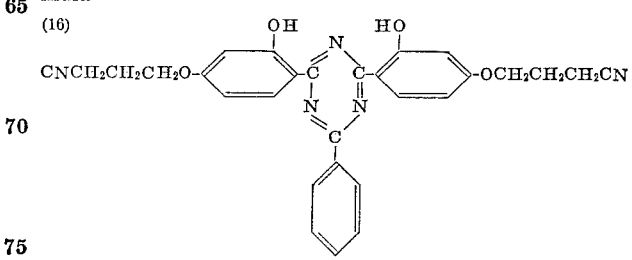

is obtained. In its analytically pure from it melts at 223 to 224° C.

$C_{29}H_{25}N_5O_4$ calculated: C, 68.62; H, 4.97; N, 13.80%. Found: C, 68.34; H, 4.89; N, 13.47%.

When crotyl bromide is replaced by the calculated amount of γ-bromobutyric acid ethyl ester, reacting for 20 hours at 70° C., and the reaction solution is poured into water, the product of the formula

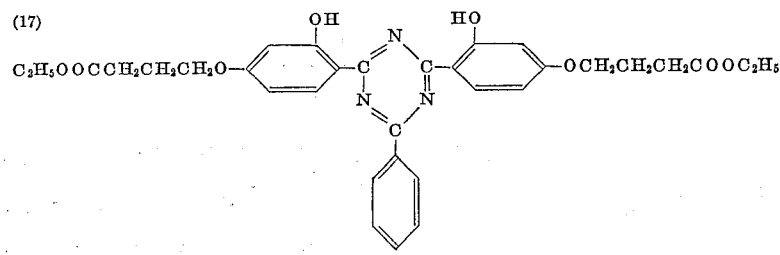

is obtained. After recrystallisation from benzene+methanol the analytically pure product melts at 100 to 101° C. with decomposition.

$C_{33}H_{35}N_3O_8$ calculated: C, 65.88; H, 5.86; N, 6.99%. Found: C, 65.67; H, 5.56; N, 7.05%.

*Example 6*

18.7 parts of the compound of the Formula 9 together with 6.3 parts of 90% solid potassium hydroxide are dissolved in 180 parts of ethyleneglycol monomethyl ether, and in the course of ½ hour 15.75 parts of 1-chloro-3-bromopropane in 10 parts of ethyleneglycol monomethyl ether are dropped in at room temperature (18 to 20° C.). The whole is then heated for 6 hours at 30° C. and for 16 hours at 45° C., and then cooled. The precipitated product is suctioned off, washed with a small amount of methanol and then with water slightly acidified with hydrochloric acid, and then dried, to yield 8.5 parts of the product of the formula

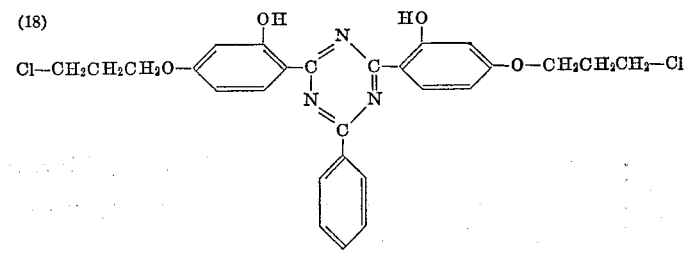

which, after two recrystallisations from benzene+methanol, melts at 181 to 183° C.

$C_{27}H_{25}O_4N_3Cl_2$ calculated: C, 61.71; H, 4.79; N, 8.00%. Found: C, 61.69; H, 4.89; N, 7.80%.

*Example 7*

18.7 parts of the compound of the Formula 9 together with 6.3 parts of 90% solid potassium hydroxide are dissolved in 180 parts of ethyleneglycol monomethyl ether, and in the course of half an hour at room temperature (18 to 20° C.) 19.9 parts of phenacylbromide dissolved in a minimum of ethyleneglycol monomethyl ether are dropped in. The batch is then stirred for 2 hours at 45° C., for 2 hours at 60° C. and for a further 2 hours at 80° C. and then cooled. The precipitated product is suctioned off, washed with a small amount of methanol and then with strongly diluted hydrochloric acid. After drying, there are obtained 27 parts of the compound of the formula

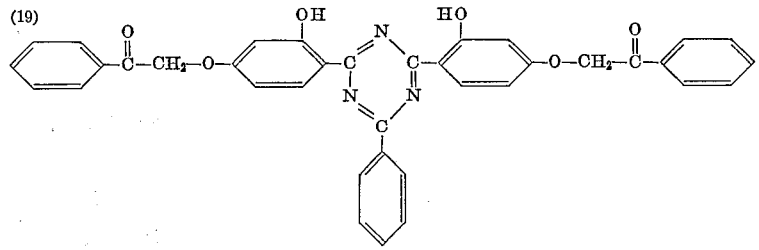

which, after four recrystallisations from dimethylformamide, melts at 280 to 281° C.

$C_{37}H_{27}O_6N_3$ calculated: C, 72.89; H, 4.46; N, 6.89%. Found: C, 72.67; H. 4.49; N, 7.05%.

*Example 8*

When in the first paragraph of Example 1 cyanuric chloride is replaced by an equivalent amount of 2-(para-

11 tertiary butyl)-phenyl-4,6-dichloro-1,3,5-triazine the compound of the formula (20)

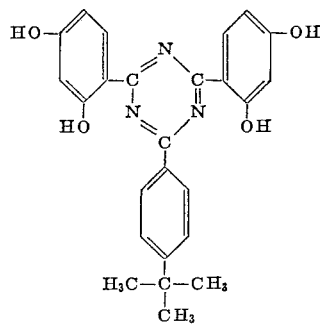

is obtained in similar purity; it melts above 300° C.

A solution of 21.45 parts of the compound of the Formula 20 in 150 parts of dimethylformamide is mixed with a solution of 5 parts of sodium hydroxide in 5 parts of water. In the course of 1 hour 13.5 parts of n-allylbromide are dropped in at 80° C., and after all n-allylbromide has been added the batch is stirred on for 4½ hours at 80° C. For processing the reaction mixture is poured into 25 parts of concentrated hydrochloric acid in 500 parts of water. The precipitated product is separated from the aqueous solution and taken up in benzene. Methanol is added to the hot benzolic solution until turbidity sets in, and the batch is then cooled to room temperature. The resulting crystalline product of the formula (21)

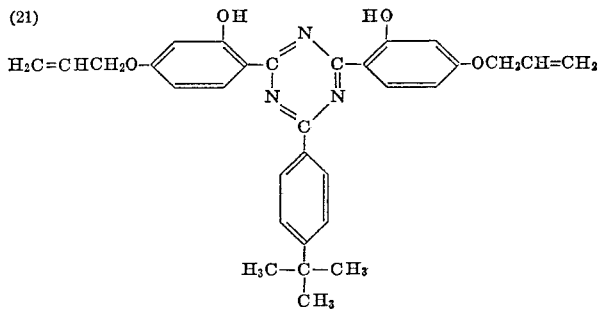

is filtered off and dried at 80° C. under vacuum. The analytically pure product obtained by recrystallisation from benzene+methanol melts at 146 to 147° C.

$C_{31}H_{31}N_3O_4$ calculated: C, 73.06; H, 6.13; N, 8.25%. Found: C, 73.15; H, 6.11; N, 8.36%.

The mother liquors from the benzene-methanolic solutions are evaporated to dryness, the residue is dissolved in benzene and chromatographed on alumina (activity III). The benzene eluates furnish further compound of the Formula 21, while the dioxane eluates furnish the compound of the formula (22)

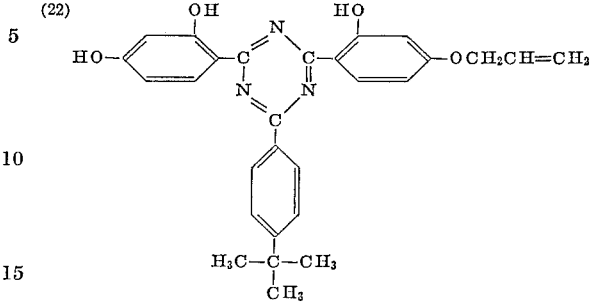

The analytically pure product obtained by recrystallisation from dioxane+cyclohexane melts at 230 to 231° C.

$C_{28}H_{27}N_3O_3$ calculated: C, 71.62; H, 5.80%. Found: C, 71.66; H, 5.80%.

When n-allylbromide is replaced by the calculated amount of benzylbromide, the product of the formula (23)

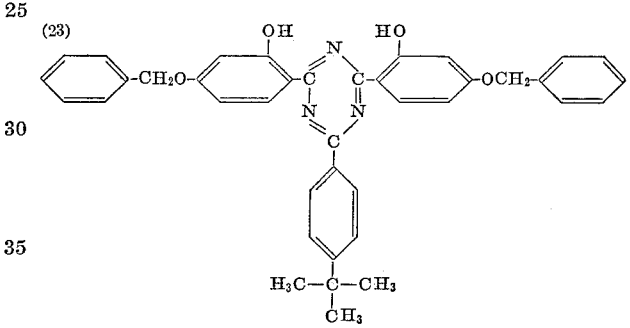

crystallises out of the reaction solution in a yield of 17.9 parts. The analytically pure product obtained by recrystallisation from benzene+methanol melts at 212 to 214° C.

$C_{39}H_{35}N_3O_4$ calculated: C, 76.82; H, 5.79; N, 6.89%. Found: C, 76.73; H, 5.82; N, 7.07%.

*Example 9*

21.5 parts of the compound of the Formula 20 are dissolved in 150 parts of dimethylformamide and 150 parts of ethylenechlorohydrin. At 80° C., in the course of 1 hour, 25 parts of sodium hydroxide in 25 parts of water are dropped in. The immediately formed precipitate is suctioned off, washed with dilute hydrochloric acid and then with water and dried at 80° C. under vacuum. Yield: 23 parts. The compound of the formula (24)

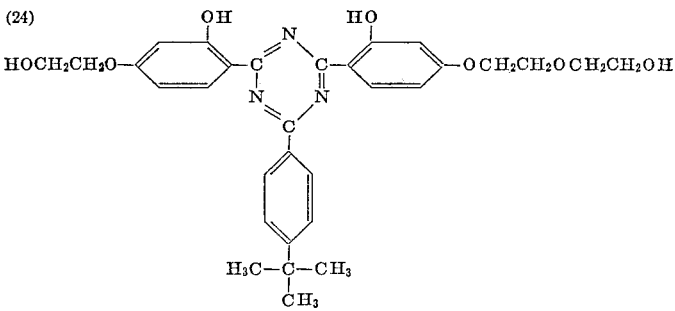

melts after recrystallisation from dioxane+cyclohexane at 181 to 188° C.

$C_{31}H_{35}N_3O_7$ calculated: C, 66.29; H, 6.28%. Found: C, 66.49; H, 5.93%.

Example 10

10.75 parts of the compound of the Formula 20, 7 parts of potassium carbonate and 6.5 parts of Chloroacetic acid ethyl ester are taken up in 300 parts of acetone and refluxed for 3 days. To process the reaction solution it is poured into 1000 parts of water, and the precipitated product of the formula

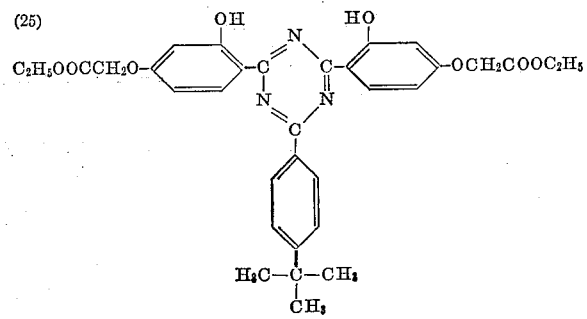

is filtered off and dried at 70° C. under vacuum. Yield: 14 parts. The analytically pure product obtained by recrystallisation from benzene+cyclohexane melts at 169 to 170° C.

$C_{33}H_{35}N_3O_8$ calculated: C, 65.88; H, 5.86; N, 6.99%. Found: C, 65.64; H, 5.81; N, 7.05%.

When twice the amount of chloroacetic acid ethyl ester is used, there results the product of the formula

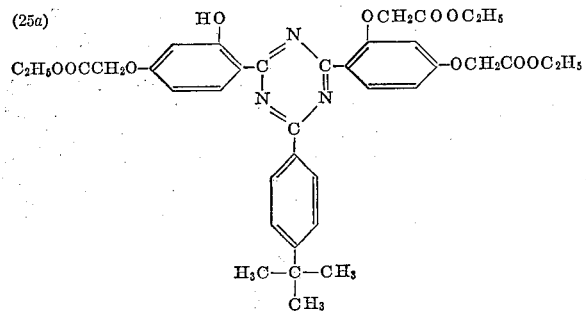

in a yield of 14.5 parts. The analytically pure product obtained by recrystallisation from benzene+cyclohexane melts at 139 to 141° C.

$C_{37}H_{41}N_3O_{10}$ calculated: C, 64.61; H, 6.01; N, 6.11%. Found: C, 64.41; H, 5.82; N, 6.36%.

Example 11

24.5 parts of the compound of the formula

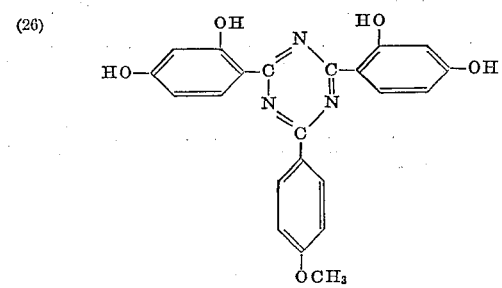

[prepared by condensing 1 mol of 2-para-methoxyphenyl-4,6-dichloro-1,3,5-triazine with 2 mols of resorcinol in the presence of aluminium chloride in nitrobenzene; M.P. 341 to 342.5° C.] are dissolved in 150 parts of dimethylformamide containing 5 parts of sodium hydroxide. In the course of 1 hour at 80° C., 13.5 parts of n-allylbromide are dropped in. The reaction solution is stirred for another 4 hours at 80° C., then heated to the reflux temperature (145° C.) and maintained at this temperature for 15 minutes. For processing the cooled batch is poured into 1000 parts of water, and the precipitated crude product (yield: 27 parts) is suctioned off and dried at 80° C. under vacuum. The product of the formula

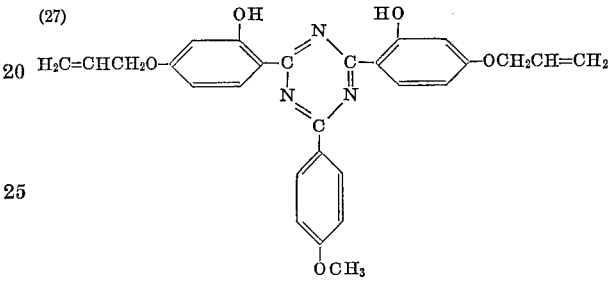

is obtained by extracting the crude product with benzene, followed by chromatography on alumina (activity III) with benzene. The analytically pure product obtained by recrystallisation from benzene+methanol melts at 135 to 137.5° C.

$C_{28}H_{25}N_3O_5$ calculated: C, 69.55; H, 5.21, N, 8.63%. Found: C, 69.65; H, 5.35; N, 8.51%.

When n-allylbromide is replaced by the calculated amount of benzylbromide, the product of the formula

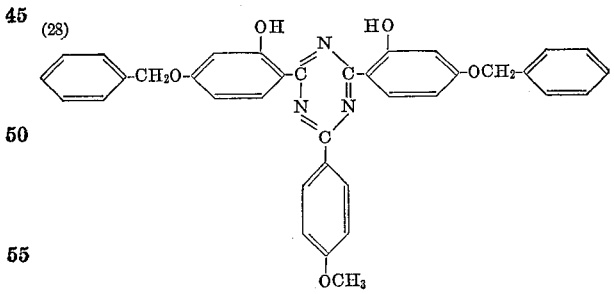

is obtained in similar yield and purity. The analytically pure product obtained by recrystallisation from dioxane +cyclohexane melts at 87 to 88° C.

$C_{36}H_{29}N_3O_5$ calculated: C, 74.08; H, 5.01; N, 7.20%. Found: C, 74.20; H, 5.16; N, 6.89%.

Example 12

10.1 parts of the compound of the Formula 26, 8 parts of potassium carbonate and 7 parts of chloroacetic acid ethyl ester in 500 parts of acetone are stirred under reflux for 3 days. The reaction product is poured into 1000 parts of water, acidified with dilute hydrochloric acid, suction-filtered and washed neutral with water. The benzene eluates of the crude product, chromatographed on alumina of activity III, furnish the compound of the formula

(29)
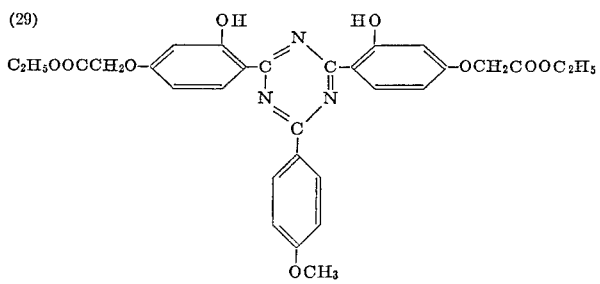

The analytically pure product obtained by recrystallisation from benzene+methanol melts at 152 to 153° C.

$C_{30}H_{29}N_3O_9$ calculated: C, 62.60; H, 5.08; N, 7.30%. Found: C, 62.44; H, 5.07; N, 7.23%.

When twice the amount of chloroacetic acid ethyl ester is used, there results the product of the formula

(30)
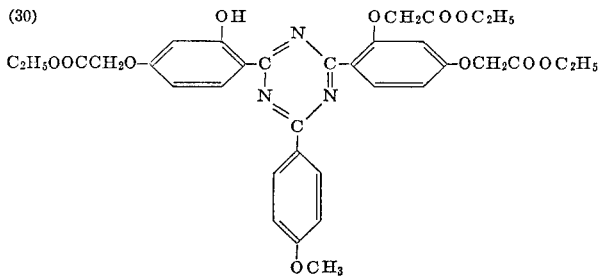

in a yield of 14.2 parts. The analytically pure product obtained by recrystallisation from benzene+cyclohexane melts at 174 to 176° C.

$C_{34}H_{35}N_3O_{11}$ calculated: C, 61.55; H, 5.33; N, 6.35%. Found: C, 61.45; H, 5.31; N, 6.36%.

*Example 13*

8.2 parts of the compound of the formula

(31)
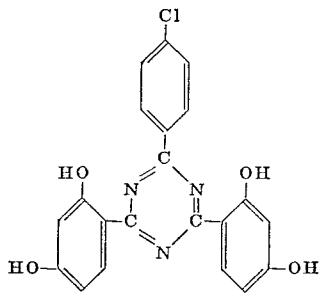

[obtained by condensing 1 mol of 2-para-chlorophenyl-4,6-dichloro-1,3,5-triazine with 2 moles of resorcinol in the presence of aluminium chloride in nitrobenzene; M.P. above 350° C.] are dissolved in 80 parts of ethyleneglycol monoethyl ether containing 2.4 parts of potassium hydroxide. While stirring the whole at 20 to 25° C., 5 parts of allylbromide are added and the temperature is thereupon raised within 1 hour to 60 to 65° C. The batch is stirred for 3 hours longer at the same temperature and then poured into 200 parts of 1% hydrochloric acid, whereupon the product of the formula

(32)
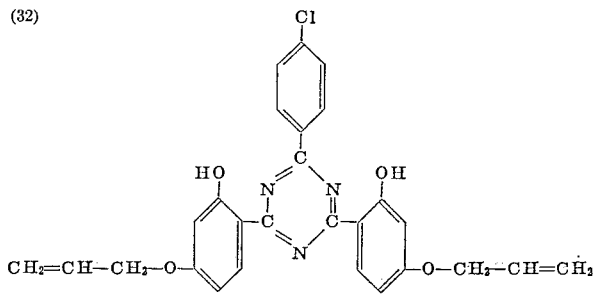

is obtained in the form of light-yellow crystals. Yield: about 8 parts. The analytically pure product obtained by two recrystallisations from benzene+methanol melts at 143 to 144° C.

$C_{27}H_{22}O_4N_3Cl$ calculated: C, 66.46; H, 4.54; N, 8.61%. Found: C, 66.77; H, 4.56; N, 8.43%.

When allylbromide is replaced by the equivalent amount of benzylbromide, there results the product of the formula

(33)
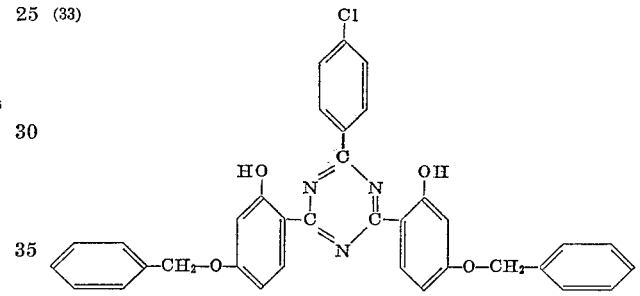

in similar purity and yield, melting at 177 to 178° C.

$C_{35}H_{26}O_4N_3Cl$ calculated: C, 71.49; H, 4.46; N, 7.15%. Found: C, 71.29; H, 4.38; N, 7.10%.

When 2-para-chlorophenyl-4,6-diresorcinyl - 1,3,5-triazine of the Formula 31 is replaced by the equivalent amount of 2-diphenyl-4,6-diresorcinyl-1,3,5-triazine [prepared by condensing 1 mol of 2-diphenyl-4,6-dichloro-1,3,5-triazine with 2 mols of resorcinol in the presence of aluminium chloride in nitrobenzene; M.P. above 350° C.], the product of the formula

(34)
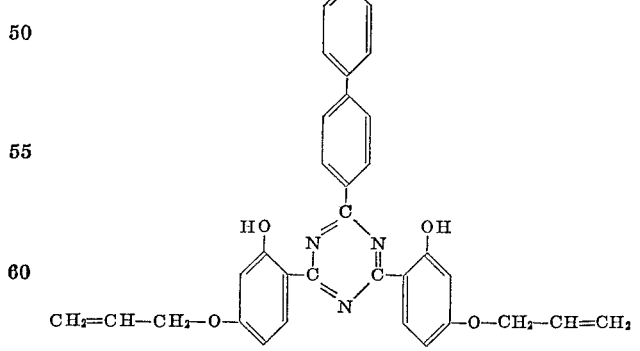

is obtained in similar yield and purity, melting at 136 to 137° C.

$C_{33}H_{27}O_4N_3$ calculated: C, 74.84; H, 5.14; N, 7.94%. Found: C, 74.67; H, 5.21; N, 7.96%.

*Example 14*

12.2 parts of triresorcinyl-1,3,5-triazine of the Formula 7 are dissolved at 120° C. in 150 parts of ethyleneglycol monomethyl ether containing 5.4 parts of potassium hydroxide. The temperature is then lowered to 55 to 60° C., 11 parts of allylbromide are stirred in, and the whole is stirred for another 4 hours at the same temperature and then poured into 200 parts of 1% hydrochloric acid, to yield the product of the formula

(35)
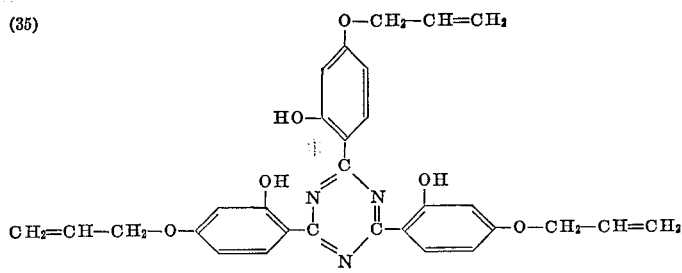

in the form of light-yellow crystals meltitng at 168 to 169° C.

$C_{30}H_{27}O_6N_3$ calculated: C, 68.56; H, 5.18; N, 8.00%. Found: C, 68.47; H, 5.32; N, 8.05%.

*Example 15*

12.2 parts of triresorcinyl-1,3,5-triazine of Formula 7 are dissolved in 150 parts of dimethylformamide containing 3.7 parts of sodium hydroxide. While stirring at 60 to 65° C., 10 parts of benzylbromide are dropped in and the batch is stirred for 4 hours at the same temperature, to yield after the usual processing the product of the formula

(36)
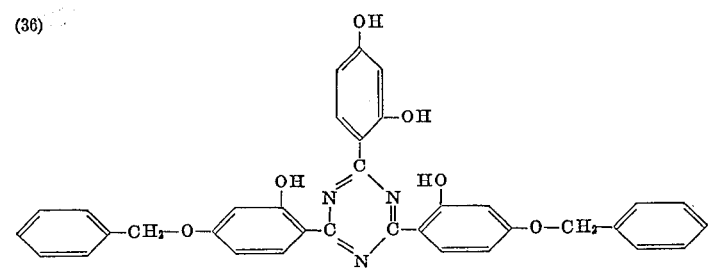

melting at 249 to 250° C.

$C_{35}H_{27}O_6N_3$ calculated: C, 71.78; H, 4.65; N, 7.18%. Found: C, 71.74; H, 4.63; N, 7.01%.

*Example 16*

6.6 parts of the compound of the formula

(37)
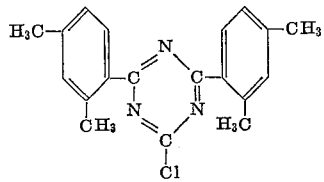

[obtained by condensing 1 mol of cyanuric chloride with 2 mols of 1,3-dimethylbenzene in the presence of aluminium chloride in benzene; M.P. 138° C.] and 3 parts of 1,3-dihydroxybenzene are dissolved in 60 parts of nitrobenzene, and at 15 to 20° C. 3 parts of anhydrous aluminium chloride are added. The temperature is raised within 30 minutes to 110° C., the batch is stirred for 3 hours longer at this temperature and then poured into a mixture of 250 parts of water, 200 parts of ice and 50 parts of concentrated hydrochloric acid. After the usual processing (of Example 1) about 8 parts of the compound of the formula

(38)
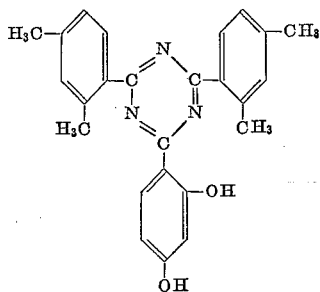

are obtained in the form of pale-yellow crystals melting at 197.5 to 198.5° C. from aqueous dimethylformamide.

20 parts of the compound of the Formula 38 are dissolved in 150 parts of dimethylformamide containing 2.5 parts of sodium hydroxide. At 80° C., within 1 hour, 7 parts of n-allylbromide in 50 parts of dimethylformamide are then dropped in. The reaction solution is stirred on for 4 hours at 80° C., then raised to the reflux temperature (145° C.), maintained for 15 minutes at this temperature, cooled to 70° C. and mixed with 50 parts of 2 N-hydrochloric acid. The precipitated product of the formula

(39)
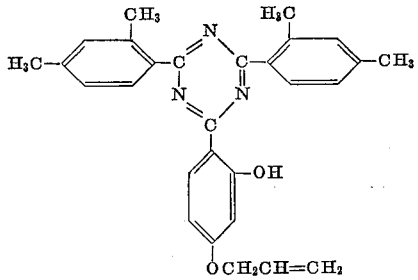

is filtered off at room temperature and dried at 80° C. under vacuum. Yield: 20 parts. The analytically pure product obtained by recrystallisation from benzene+cyclohexane melts at 141 to 142° C.

$C_{28}H_{27}N_3O_3$ calculated: C, 76.86; H, 6.22; N, 9.61%. Found: C, 77.05; H, 6.22; N, 9.54%.

When allylbromide is replaced by 11.5 parts of sodium chloroacetate, there are obtained 9.4 parts of the compound of the formula (40)

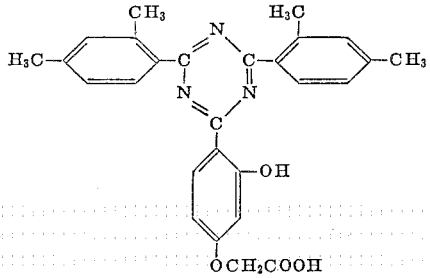

The analytically pure product obtained by recrystallisation from aqueous dioxane melts at 215 to 216° C.

$C_{27}H_{25}N_3O_4$ calculated: C, 71.19; H, 5.53; N, 9.23%. Found: C, 71.26; H, 5.58; N, 9.35%.

*Example 17*

20 parts of the compound of the Formula 38, 8 parts of potassium carbonate and 7 parts of benzylchloride are taken up in 200 parts of acetone, and the resulting solution is refluxed for 4 days, then mixed with 100 parts of water; the precipitated product of the formula (41)

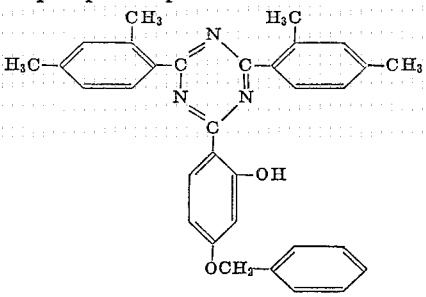

is filtered off, washed with water and dried at 80° C. under vacuum. Yield: 23.9 parts. The analytically pure product obtained by recrystallisation from dichlorobenzene+methanol melts at 164° C.

$C_{32}H_{29}N_3O_2$ calculated: C, 78.82; H, 6.00; N, 8.62%. Found: C, 78.83; H, 5.83; N, 8.43%.

When benzylchloride is replaced by the equivalent amount of para-chlorobenzylchloride, the acetone by dioxane, and instead of for 3 days the reaction is continued for 12 hours, the product of the formula (42)

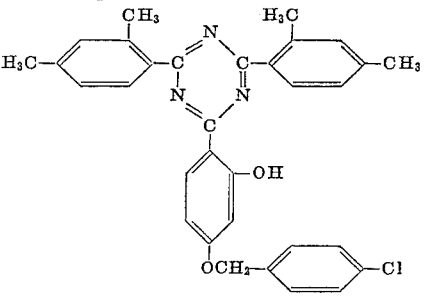

is obtained is similar yield and purity, melting at 153 to 155° C.

$C_{32}H_{28}N_3O_2Cl$ calculated: C, 73.62; H, 5.41; N, 8.05; Cl, 6.79%. Found: C, 73.81; H, 5.47; N, 7.97; Cl, 6.91%.

*Example 18*

20 parts of the compound of the Formula 38 and 150 parts of ethylene chlorohydrin are dissolved in 150 parts of dimethylformamide, whereupon within 1 hour at 80° C. a solution of 20 parts of sodium hydroxide in 20 parts of water is dropped in. When all sodium hydroxide has been added, the batch is cooled to room temperature and the precipitated product of the formula (43)

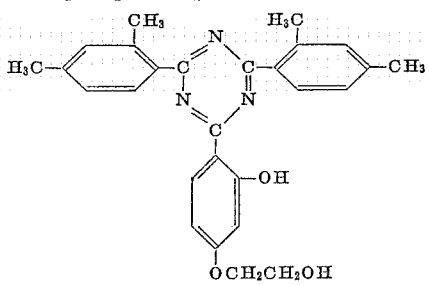

is suctioned off and washed with water. For a first purification the product is pasted in the cold in water and hydrochloric acid, suctioned off and dried at 80° C. under vacuum. Yield: 13.5 parts. The analytically pure product obtained by recrystallisation from aqueous dioxane melts at 176° C.

$C_{27}H_{27}N_3O_3$ calculated: C, 73.45; H, 6.16; N, 9.52%. Found: C, 73.37; H, 5.88; N, 9.25%.

*Example 19*

20 parts of the compound of the Formula 38, 8 parts of potassium carbonate and 12.2 parts of chloroacetic acid ethyl ester are taken up in 200 parts of acetone and the resulting solution is refluxed for 3 days. For processing the reaction mixture it is poured into 1000 parts of water and acidified with hydrochloric acid. The precipitated, resinous products are taken up in ethyl acetate, agitated with hydrochloric acid and washed neutral with water. The ethyl acetate extracts are dried over sodium sulphate and evaporated to dryness. Yield: 23 parts. The product of the formula (44)

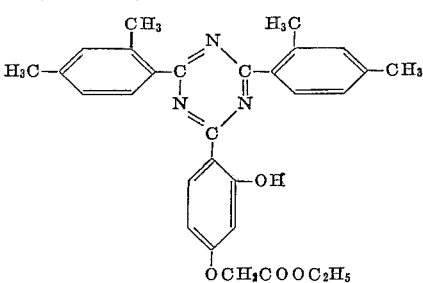

is recrystallised from cyclohexane and melts at 94 to 97° C.

$C_{29}H_{29}N_3O_4$ calculated: C, 72.03; H, 6.05; N, 8.69%. Found: C, 71.90; H, 5.95; N, 8.78%.

*Example 20*

20 parts of the compound of the Formula 38, 2.8 parts of potassium hydroxide and 10 parts of γ-bromobutyric acide ethyl ester are dissolved in 150 parts of ethyleneglycol monomethyl ether. The reaction solution is heated for 3 hours at 35 to 40° C. and then for 14 hours at 65 to 70° C. The precipitated product of the formula (45)

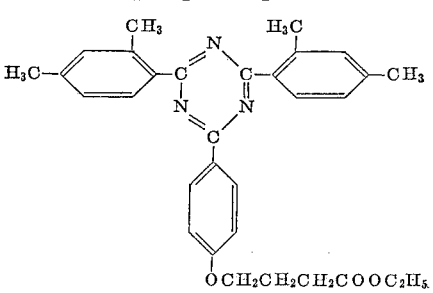

is suctioned off and recrystallised from benzene+ methanol. Yield after two recrystallisations: 12.7 parts. Melting point 125 to 126° C.

$C_{31}H_{33}N_3O_4$ calculated: C, 72.77; H, 6.50; N, 8.21%. Found: C, 72.40; H, 6.29; N, 8.13%.

When γ-bromobutyric acid ethyl ester is replaced by the equivalent amount of crotylbromide, the product of the formula

(46)
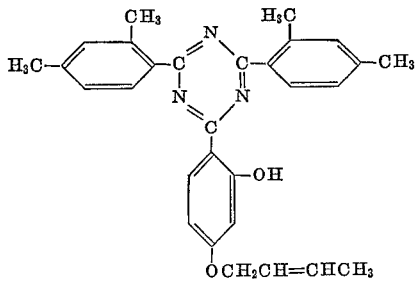
OCH₂CH=CHCH₃ is obtained in a similar purity and yield, melting at 159 to 160° C.

$C_{29}H_{29}N_3O_2$ calculated: C, 77.13; H, 6.47; N, 9.31%. Found: C, 77.15; H, 6.40; N, 9.47%.

When γ-bromobutyric acid ethyl ester is replaced by the equivalent amount of bromoacetic acid glycol ester, the product of the formula

(47)
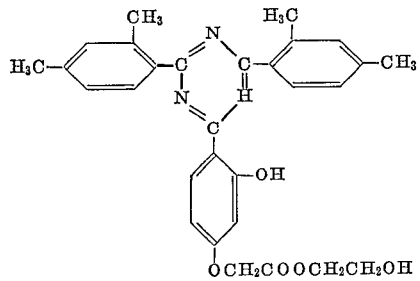
OCH₂COOCH₂CH₂OH is obtained in a similar purity and yield, melting at 93 to 94° C.

$C_{29}H_{29}N_3O_5$ calculated: C, 69.72; H, 5.85; N, 8.41%. Found: C, 69.51; H, 5.93; N, 8.39%.

Example 21

A film about 60μ thick is prepared from a 10% acetonic solution of acetylcellulose, containing 1% of the compound of the Formula 24 referred to the weight of acetylcellulose. The dried film reveals the following values of light transmission in percent:

| Wavelength in mμ | Light transmission in percent | |
|---|---|---|
| | Unexposed film | Film exposed for 100 hours in a fadeometer |
| 280 to 370 | 0 | 0 |
| 380 | 9 | 9 |
| 390 | 44 | 44 |
| 400 | 72 | 72 |
| 410 | 83 | 83 |

Similar results are obtained with the compounds of the formula 11, 14 or 47.

Example 22

10.000 parts of a polyamide in chip form, prepared in known manner from hexamethylenediamine adipate, are mixed for 12 hours in a tumbler with 30 parts of titanium dioxide (rutile modification) and with 50 parts of the compound of the Formula 11, 14, 24, 38, 40, 43 or 47. The chips treated in this manner are then melted in a boiler heated with oil at 300 to 310° C., after having displaced the atmospheric oxygen from it by means of superheated steam, and the melt is stirred for half an hour, then expressed under a nitrogen pressure of 5 atmospheres (gauge) through a spinneret, and the cooled filament spun in this manner is wound on a spinning bobbin. The tear strength of the resulting filaments after stretching is much less reduced by the action of light than that of filaments manufactured in the same manner but without addition of the compound of the Formula 11, 14, 24, 38, 40, 43 or 47.

Example 23

A paste from 65 parts of polyvinyl chloride, 32 parts of dioctyl phthalate and 0.2 part of the compound of the Formula 10 is rolled to and fro on a calender heated at 145 to 150° C. to form a foil about 0.5 mm. thick.

The polyvinyl chloride foil manufactured in this manner absorbs all ultraviolet rays within the range of 280 to 380 mμ.

Instead of the compound of the Formula 10 there may be used any one of the compounds of the Formulae 11 to 19, 21 to 25, 27 to 30, 32 to 36 and 39 to 47.

Example 24

1.0 part of the compound of the Formula 11 is dissolved in 50 parts of N-sodium hydroxide solution and 100 parts by volume of ethanol. 3000 parts of water and 3 parts of an aqueous solution of the adduct from 35 mols of ethylene oxide with 1 mol of stearyl alcohol are then added. The resulting solution is neutralised with 10% sulfuric acid while checking with a potentiometer until the pH value has reached 7, whereupon a fine dispersion forms. 100 parts of a fabric from polyamide fibers (prepared from hexamethylenediamine and adipic acid) are immersed in the bath at room temperature, the whole is slowly raised to the boil and the fabric is then treated for another hour at the boil, then removed from the bath, rinsed in cold water and dried.

The fabric treated in this manner displays after 100 hours' exposure to a xenon lamp a much lesser drop in tear strength than when the compound of the Formula 11 has been omitted.

Similar good results are obtained when the compound of the Formula 11 is replaced by the compound of the Formula 10, 12, 13, 38 or 40.

Example 25

A paper pulp is manufactured in a hollander from 150 parts of bleached sulfite or sulfate cellulose
60 parts of zinc sulfide
3 parts of a finely dispersed aqueous paste containing 30% of the azo pigment of the formula

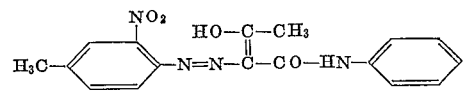

and 5000 parts of water.

The decorative paper prepared from this pulp is immersed with untreated tissue or overlay paper in a bath consisting of 100 parts of a pulverulent, curable, water-soluble condensation product from 1 mol of melamine and about 2 mols of formaldehyde, and
100 parts of mixture consisting of a solution prepared from 0.5 part of the compound of the Formula 10, 12, 13, 38, 40, 44 or 47 in 19.5 parts of dimethylformamide, diluted with 80 parts of water.

The excess resin solution is then removed and the papers are dried.

The decorative paper prepared in this manner, together with the treated tissue paper used as cover sheet, is pressed on a substrate consisting of a layer of phenol paper and blocking sheets impregnated with melamine resin as interlayer for 10 minues at 140 to 150° C. under a pressure of 100 kg. per square centimeter.

After having been exposed in a fadeometer the resulting laminate is much faster to light than a similar laminate that does not contain the compound of the Formula 10, 12, 13, 38, 40, 44, or 47.

*Example 26*

A mixture of 100 parts of polyethylene and 0.2 part of a compound of the Formulas 10, 12 to 19, 21 to 25, 27 to 30, 32, 34, 35, 39 to 47 is rolled on a calender at 130 to 140° C. to form a foil which is then pressed at 150° C.

The polyethylene foils obtained in this manner are substantially impermeable to ultraviolet rays of a wavelength of 280 to 380 mµ.

*Example 27*

A mixture of 100 parts of polypropylene (Moplene AS) and 0.2 part of a compound of the Formulas 12 to 19, 21, 23, 25, 27, 30, 35, 36, 39, 42 or 47 is made into a fleece on a calender at 170° C., and then pressed into a sheet 1 mm. thick at 230 to 240° C. under a sheet 1 mm. thick at 230 to 240° C. under a pressure not exceeding 40 kg. per square centimeter.

The resulting polypropylene sheet does not transmit ultraviolet rays within the range from 280 to 380 mµ.

What is claimed is:

1. A hydroxyphenyl-1,3,5-triazine of the formula

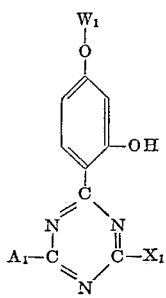

wherein
$A_1$ and $X_1$ each is a member selected from the group consisting of

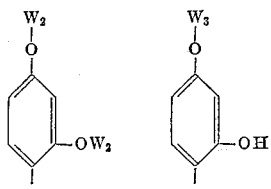

and

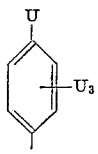

$W_1$ and $W_3$ each is selected from the group consisting of lower alkenyl, lower hydroxyalkyl, hydroxy(lower)alkoxy(lower)alkyl, lower haloalkyl, lower cyanoalkyl, carboxy(lower)alkyl, carb(lower)alkoxy(lower)alkyl, phenyl(lower)alkyl, halophenyl(lower)alkyl and phenacyl;

$W_2$ is selected from the group consisting of hydrogen, lower alkenyl, lower hydroxyalkyl, hydroxy(lower)alkoxy(lower)alkyl, lower haloalkyl, lower cyanoalkyl, carboxy(lower)alkyl, carb(lower)alkoxy(lower)alkyl, phenyl(lower)alkyl, halophenyl(lower)alkyl and phenacyl;

U stands for a member selected from the group consisting of hydrogen, halogen, lower alkyl, lower alkoxy and phenyl;

and $U_3$ is selected from the group consisting of hydrogen and lower alkyl.

2. The hydroxyphenyl-1,3,5-triazine of the formula

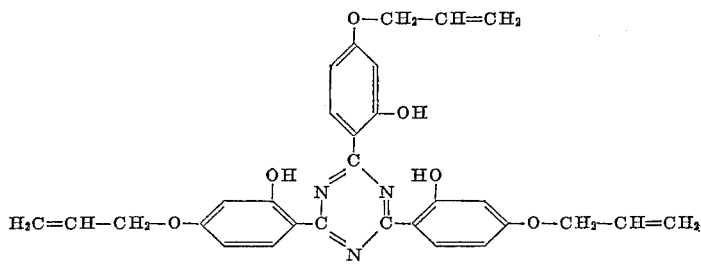

3. The hydroxyphenyl-1,3,5-triazine of the formula

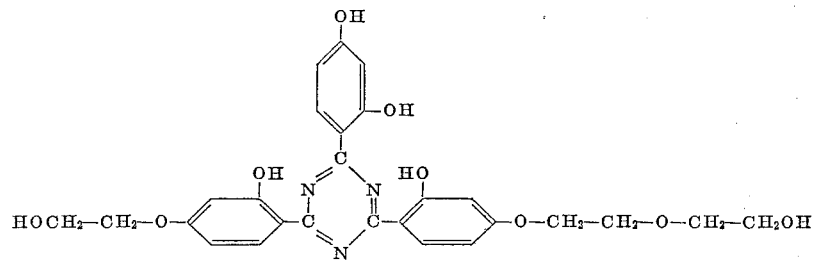

4. The hydroxyphenyl-1,3,5-triazine of the formula
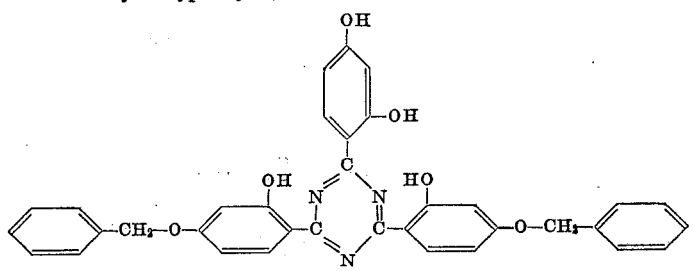
5. The hydroxyphenyl-1,3,5-triazine of the formula
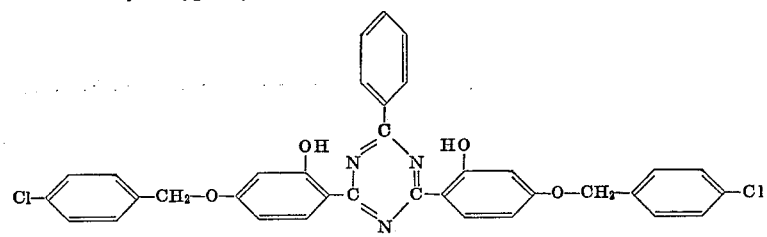
6. The hydroxyphenyl-1,3,5-triazine of the formula
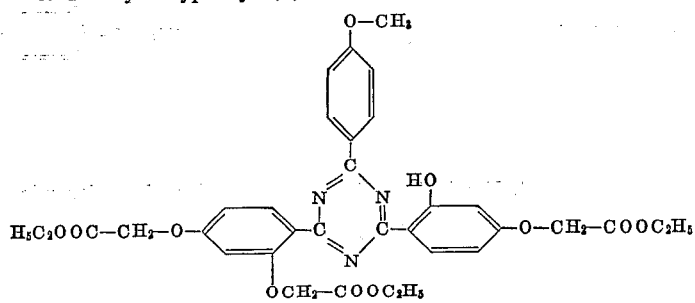
7. The hydroxyphenyl-1,3,5-triazine of the formula
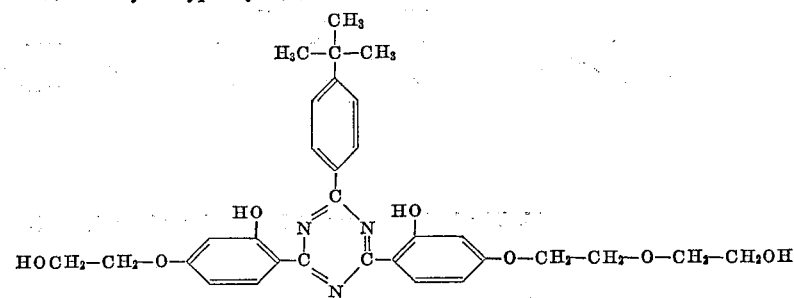
8. The hydroxyphenyl-1,3,5-triazine of the formula
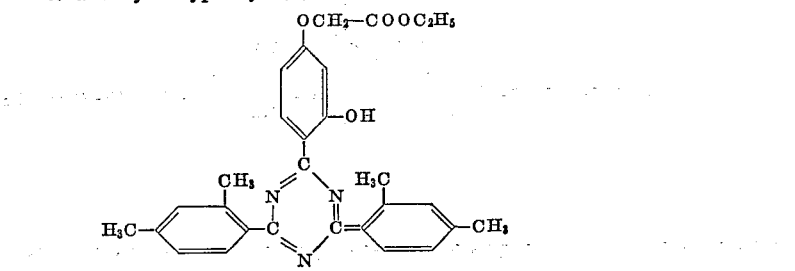
9. The hydroxyphenyl-1,3,5-triazine of the formula
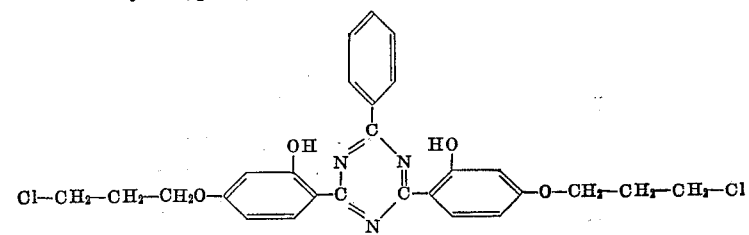

10. The hydroxyphenyl-1,3,5-triazine of the formula
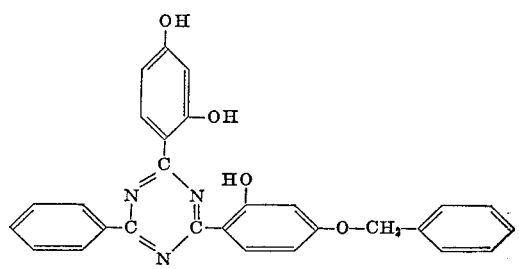
11. The hydroxyphenyl-1,3,5-triazine of the formula
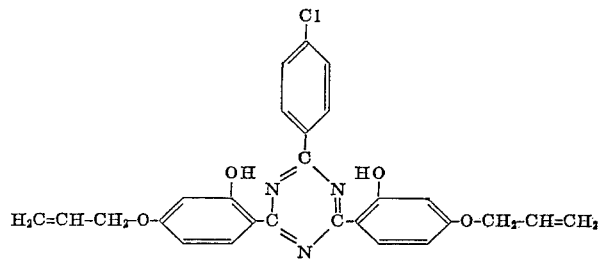
12. The hydroxyphenyl-1,3,5-triazine of the formula
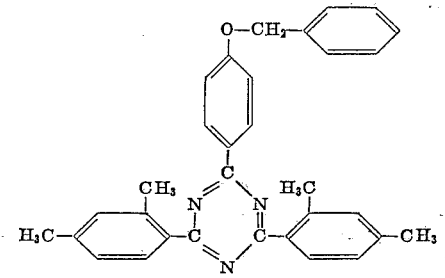
13. The hydroxyphenyl-1,3,5-triazine of the formula
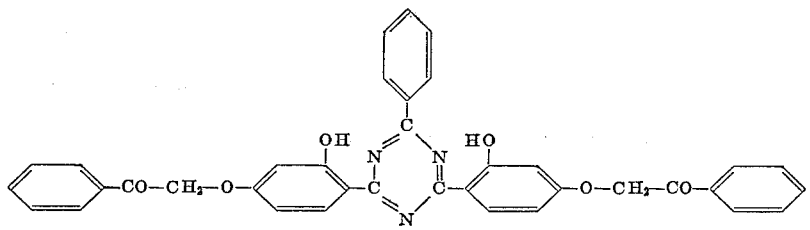
14. The hydroxyphenyl-1,3,5-triazine of the formula
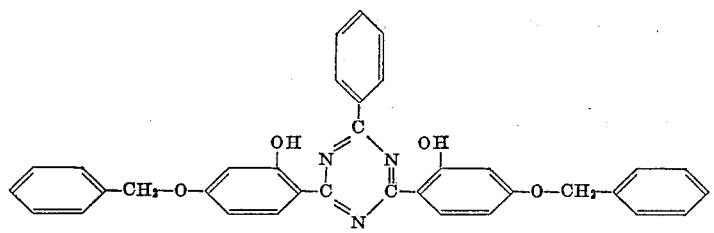
15. The hydroxyphenyl-1,3,5-triazine of the formula
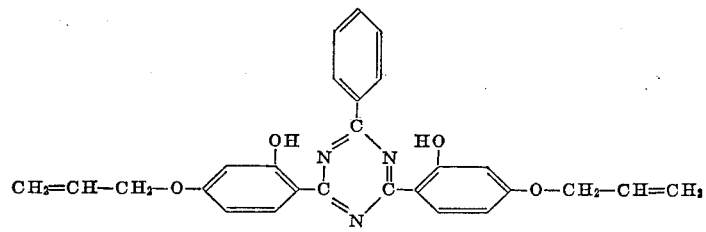
16. The hydroxyphenyl-1,3,5-triazine of the formula
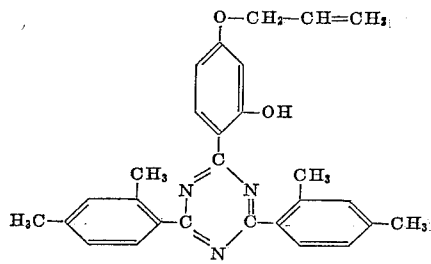

17. The hydroxyphenyl-1,3,5-triazine of the formula
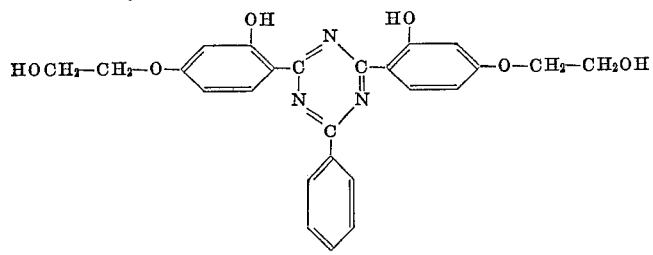
18. The hydroxyphenyl-1,3,5-triazine of the formula
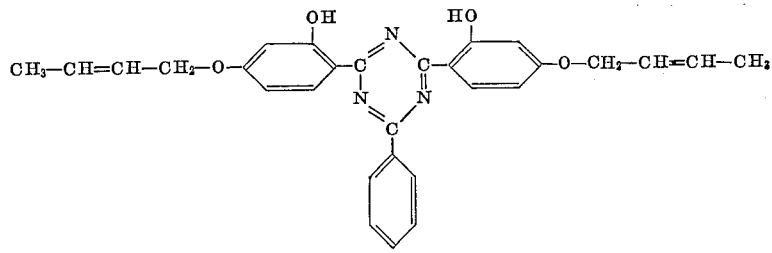
19. The hydroxyphenyl-1,3,5-triazine of the formula
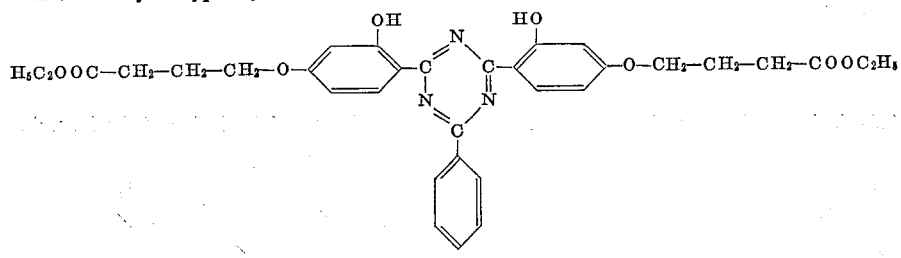
20. The hydroxyphenyl-1,3,5-triazine of the formula
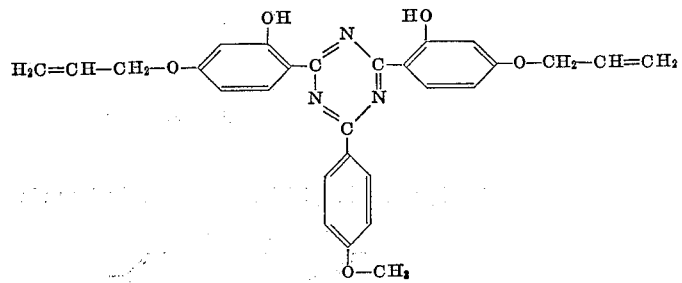
21. The hydroxyphenyl-1,3,5-triazine of the formula
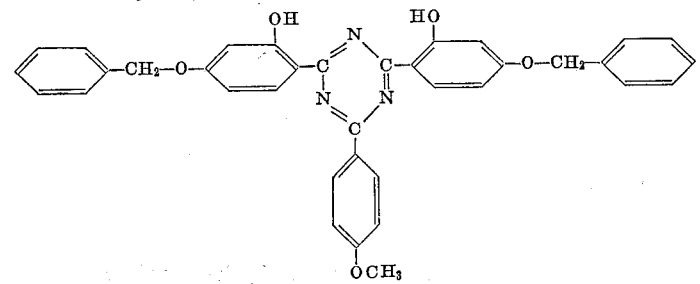
22. The hydroxyphenyl-1,3,5-triazine of the formula
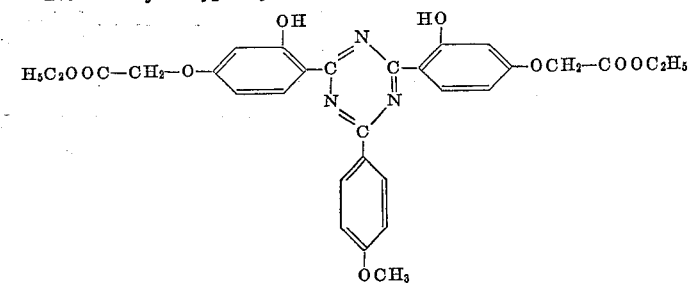

23. The hydroxyphenyl-1,3,5-triazine of the formula

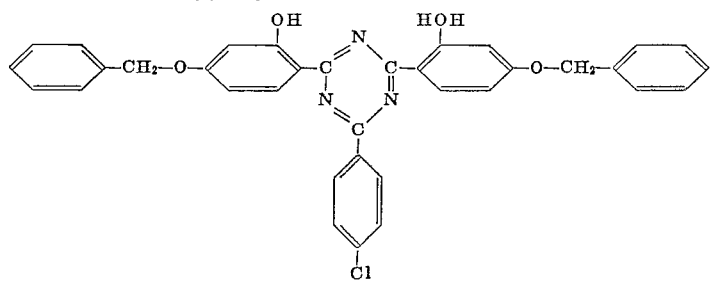

24. The hydroxyphenyl-1,3,5-triazine of the formula

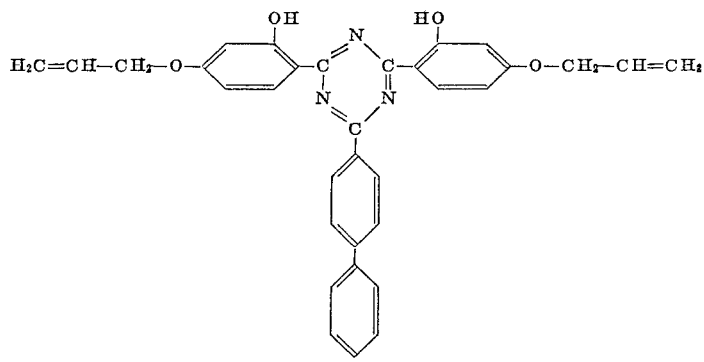

25. The hydroxyphenyl-1,3,5-triazine of the formula

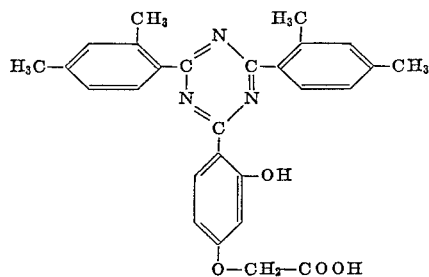

26. The hydroxyphenyl-1,3,5-triazine of the formula

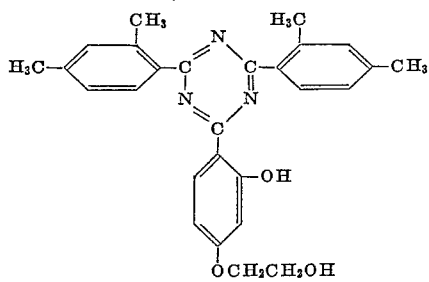

27. The hydroxyphenyl-1,3,5-triazine of the formula

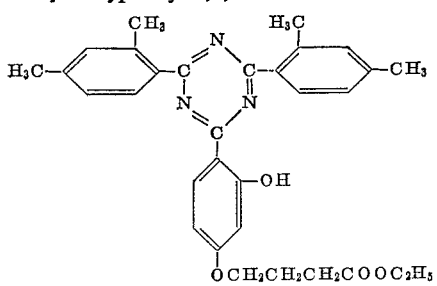

28. The hydroxyphenyl-1,3,5-triazine of the formula

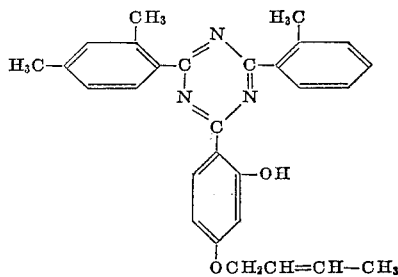

29. The hydroxyphenyl-1,3,5-triazine of the formula

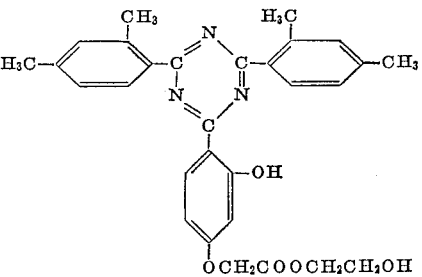

References Cited by the Examiner

UNITED STATES PATENTS 3,113,943  12/1963  Johns et al. _____ 260—248
3,118,887  1/1964  Hardy et al. _____ 260—248

WALTER A. MODANCE, *Primary Examiner.*

NICHOLAS S. RIZZO, M. W. WESTERN, J. M. FORD,
*Assistant Examiners.*

UNITED STATES PATENT OFFICE
CERTIFICATE OF CORRECTION

Patent No. 3,244,708                      April 5, 1966

Max Duennenberger et al.

It is hereby certified that error appears in the above numbered patent requiring correction and that the said Letters Patent should read as corrected below.

Column 28, lines 2 to 12, for that portion of the formula reading

     read     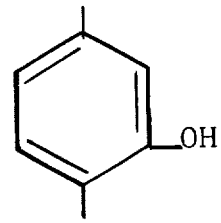

same column 28, in the formula of claim 15, for the portion reading "-O-$CH_2$-CH=$CH_5$" read -- -O-$CH_2$-CH=$CH_2$ --; column 31, in the formula of claim 23, for the portion reading

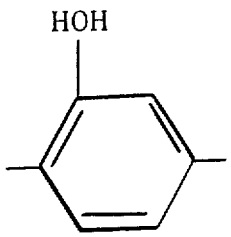     read     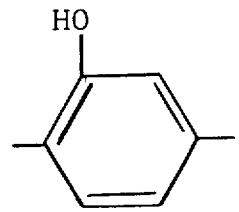

Signed and sealed this 1st day of August 1967.

(SEAL)
Attest:

EDWARD M. FLETCHER, JR.
Attesting Officer

EDWARD J. BRENNER
Commissioner of Patents